July 24, 1934. V. S. FIRESTONE 1,967,750
NUT CRACKER
Filed Dec. 22, 1932
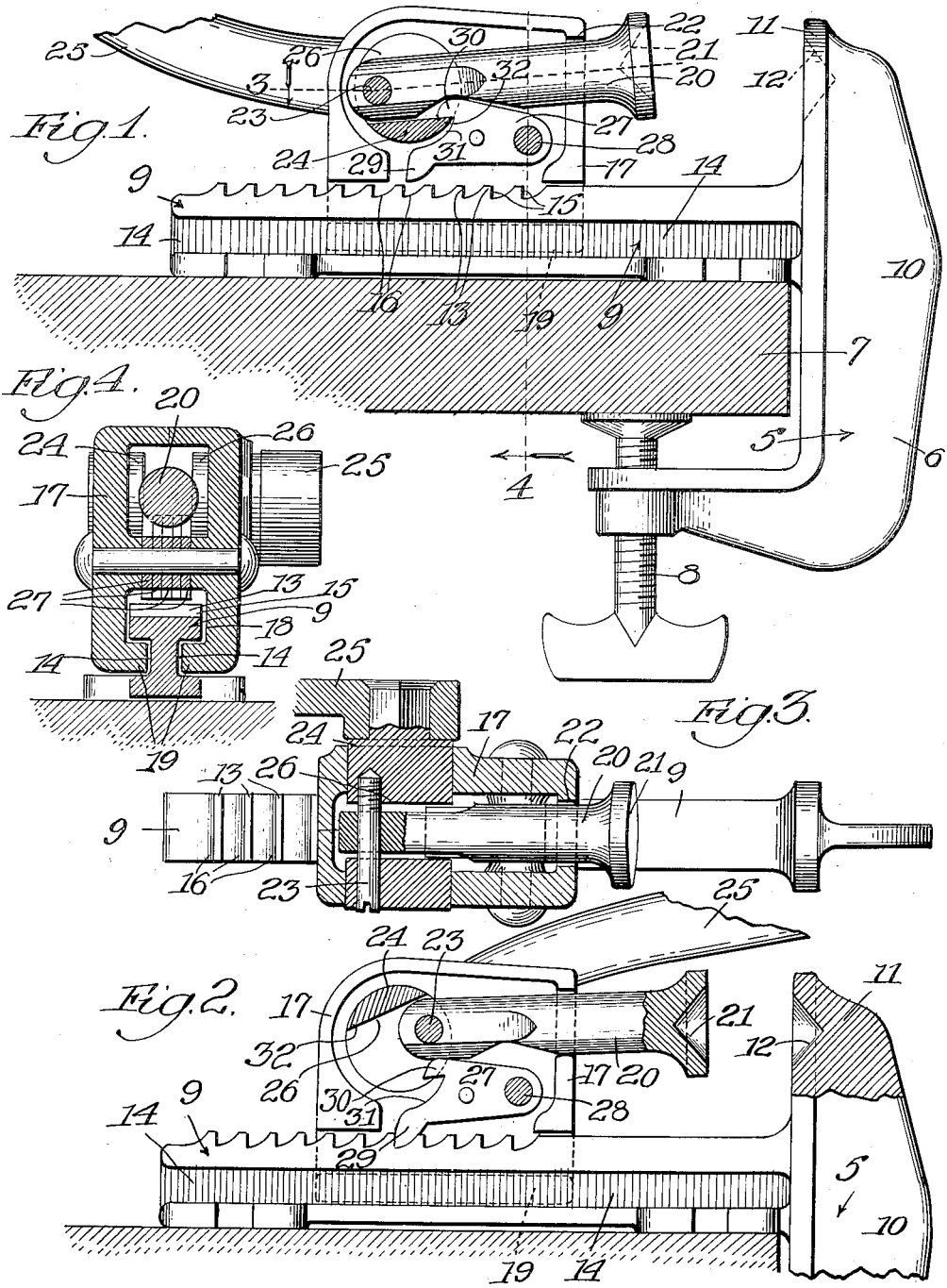
Inventor:
Vance S. Firestone,
By Dyrenforth, Lee, Chritton & Wiles,
Attys.

Patented July 24, 1934

1,967,750

UNITED STATES PATENT OFFICE 1,967,750

NUT CRACKER

Vance S. Firestone, Freeport, Ill., assignor to Arcade Manufacturing Company, Freeport, Ill., a corporation of Illinois Application December 22, 1932, Serial No. 648,494

6 Claims. (Cl. 146—16)

My object, generally stated, is to provide a construction of nutcracker which will be strong and durable and by which the operator may apply, under complete control, the force necessary to properly crack the nuts.

Referring to the accompanying drawing which illustrates an embodiment of my invention in a construction adapted to be secured to a table top or the like:

Figure 1 is a view in elevation and partly sectional of a nutcracker constructed in accordance with my invention and mounted on a table for use, the parts of the device being shown in the position they occupy when the movable jaw is retracted.

Figure 2 is a similar view showing the movable jaw advanced to operative position.

Figure 3 is a section taken at the line 3 on Fig. 1 and viewed in the direction of the arrow; and Figure 4, a section taken at the line 4 on Fig. 1 and viewed in the direction of the arrow.

The device shown comprises a body member 5 shown as in the form of a frame having a yoke portion 6 at which the device is adapted to be applied to straddling position on a support, as for example a table top shown at 7, to which it is secured as by a clamp-screw 8, the frame also comprising a horizontally disposed bar portion 9, forming a guideway, which extends from the cross portion 10 of the yoke below its upper end, the portion of the yoke above the bar portion 9 forming a jaw 11 preferably recessed at 12 to form a seat for the nuts to be cracked. The bar portion 9 is provided along its upper surface with a row of teeth 13 forming a rack and its sides are longitudinally grooved as represented at 14, those edges of the teeth which face toward the jaw 11 being preferably abrupt as shown at 15 and their opposite edges receding as shown at 16.

The device also comprises a slide 17 mounted on the bar portion 9 and slidable therealong toward and away from the jaw 11, the slide 17 has a slot 18 in its bottom straddling the bar 9 and being held in place thereon by flanges 19 on the slide extending inwardly into the grooves 14.

Mounted on the slide 17 to be reciprocated thereon toward and away from the jaw 11 is a movable jaw 20 shown as in the form of a plunger containing in its outer end a recess 21 forming a seat for the nuts to be cracked and opposing the recess 12 in the jaw 11. The jaw 20 slides in an opening 22 in an end wall of the slide 17 and connects with a crank pin 23 carried by a rock shaft 24 journaled in the slide 17 to extend crosswise of the bar portion 9 and having an operating lever-handle 25 on its outer end. The rock shaft 24 contains a recess 26 in its side in registry with the space within the slide 17 into which recess the inner end of the jaw 20 extends and in the opposite side walls of which the crank pin 23 is mounted at its ends.

The device also comprises means for holding the slide in adjusted position along the bar portion 9 during the nut cracking operation, the means shown comprising a detent, in the form of a pawl 27, located in the space within the slide 17. The pawl 27, which preferably is formed of a plurality of flatwise opposed plate-sections as shown, is pivoted at one end on a cross pin 28 mounted on the slide 17 and at its opposite end is provided with a tooth 29 extending above, and adapted by the force of gravity to swing into engagement with, the teeth 13, the tooth 29 coacting with the abrupt side wall 15 of the adjacent tooth 13 as shown in Fig. 2, to securely hold the slide against movement to the left in this figure.

The pawl 27 is provided with a projection 30 flanking a recess 31 therein above the tooth 29, the projection 30 extending into the path of movement of an edge portion 32 of the bottom wall of the recess 26 during a certain portion of the rotation of the rock shaft 24, as hereinafter described, for the purpose of lifting the pawl out of engagement with the rack 13.

Assuming the parts of the device to be in the positions shown in Fig. 1 in which the movable jaw 21 is in retracted position, the pawl is held in raised position by engagement of the portion 32 of the shaft 24 with the projection 30 on the pawl 27.

To crack a nut positioned against the jaw 11 the operator having pushed the slide 17 into a position in which the jaw 20 engages the nut positioned as stated, swings the lever 25 from the position shown in Fig. 1 to the position shown in Fig. 2, thereby rotating the shaft 24 clockwise in Figs. 1 and 2. In the initial rotation of the shaft in the direction stated the edge portion 32 moves downwardly thereby permitting the pawl 27 to lower and engage at its tooth 29 with the adjacent tooth 13 on the bar 9 locking the slide 17 against retrograde movement. In the continuing rotation of the shaft 24 the jaw 20 is forced toward the jaw 11 to exert the desired pressure for cracking the nut. In the reverse operation of the shaft 24, by swinging the lever 25 back to the position shown in Fig. 1 the jaw 20 is returned to normal retracted position, the edge portion 32 of the shaft in the final rotation thereof engaging the underside of the tooth 30 and swinging the pawl 27 clear of the teeth 13, thereby permitting of the adjustment of the slide 17 along the bar 9 in either direction as desired.

While I have illustrated and described a particular construction embodying my invention, I do not wish to be understood as intending to limit it thereto as the same may be variously modified and altered and the invention embodied in other forms of structure without departing from the spirit thereof.

What I claim as new, and desire to secure by Letters Patent, is:

1. A nut cracker comprising a body member having a jaw and a toothed portion, a slide on said body member movable toward and away from said jaw, a detent movable on said slide and cooperating with said toothed portion for holding said slide in adjusted position on said body member, a jaw on said slide and movable thereon toward and away from said first-named jaw, and means on said slide for actuating said second-named jaw relative to said slide and operating to control the position of said detent relative to said toothed portion.

2. A nut cracker comprising a body member having a jaw and a toothed portion, a slide on said body member movable toward and away from said jaw, a detent on said slide and movable automatically into engagement with said toothed portion for holding said slide in adjusted position on said body member, a jaw on said slide and movable thereon toward and away from said first-named jaw, and means on said slide for actuating said second-named jaw relative to said slide and operating, in its movement to move said second-named jaw away from said first-named jaw, to move said detent out of engagement with said toothed portion.

3. A nut cracker comprising a body member having a jaw and a toothed portion, a slide on said body member movable toward and away from said jaw, a pawl on said slide and movable, by gravity, into engagement with said toothed portion for holding said slide in adjusted position on said body member, a jaw on said slide and movable thereon toward and away from said first-named jaw, and means on said slide for actuating said second-named jaw relative to said slide and operating, in its movement to move said second-named jaw away from said first-named jaw, to move said detent out of engagement with said toothed portion.

4. A nut cracker comprising a body member having a jaw and a toothed portion, a slide on said body member movable toward and away from said jaw, a detent movable on said slide and cooperating with said toothed portion for holding said slide in adjusted position on said body member, a jaw on said slide and movable thereon toward and away from said first-named jaw, a rock member on said slide, means on said rock member for actuating said second jaw relative to said slide, and means on said rock member for controlling the position of said detent relative to said toothed portion.

5. A nut cracker comprising a body member having a jaw and a toothed portion, a slide on said body member movable toward and away from said jaw, a detent movable on said slide and cooperating with said toothed portion for holding said slide in adjusting position on said body member, a jaw on said slide and movable thereon toward and away from said first-named jaw, a rock member on said slide, means on said rock member for actuating said second jaw relative to said slide, and a projection on said rock member engaging said detent for controlling the position of the latter relative to said toothed portion.

6. A nut cracker comprising a body member having a jaw and a toothed portion, a slide on said body member movable toward and away from said jaw, a detent movable on said slide and co-operating with said toothed portion for holding said slide in adjusted position on said body member, a jaw on said slide movable toward and away from said first-named jaw, a rock member on said slide and containing a recess in its side into which said second-named jaw extends, and means pivoting said second-named jaw on said slide, said detent having a projection adapted to be engaged by a portion of the bottom wall of said recess for moving the detent out of engagement with said toothed portion in the movement of said rock member in a direction for retracting said second-named jaw.

VANCE S. FIRESTONE.